United States Patent Office 2,967,884
Patented Jan. 10, 1961

2,967,884
PREPARATION OF ACRYLIC ACID ESTERS

Jesse T. Dunn and William R. Proops, Charleston, W. Va., assignors to Union Carbide Corporation, a corporation of New York No Drawing. Filed Apr. 1, 1958, Ser. No. 725,516

7 Claims. (Cl. 260—486)

This invention relates to the production of acrylic acid esters. More particularly it is concerned with new catalysts for carrying out the interaction of acetylene, carbon monoxide and an alcohol to produce acrylic acid esters.

It is well known that acrylic acid and its esters can be produced by the reaction of acetylene and carbon monoxide with compounds having a replaceable hydrogen, such as water, alcohols, carboxylic acids, ammonia and amines, in the presence of a metal carbonyl, or other catalyst, for example, the complex triphenyl phosphine-nickel halide compounds, or the complex nickel halide-quaternary ammonium compounds.

It has now been found that the complex combinations obtained by the admixture of a nickel halide with an organic phosphine sulfide or an organic thiophosphate are very efficient catalysts for the production of acrylic acid esters from acetylene, carbon monoxide and an alcohol at milder conditions of temperature and pressure than heretofore employed. The suitable phosphorus-sulfur compounds are characterized by the presence of a pentavalent phosphorus atom in the $>P=S$ radical, wherein a sulfur atom attached to the phosphorus atom is a thiono radical.

The catalyst complexes suitable for use as catalysts in this invention are prepared by admixing a nickel halide, such as nickel bromide, nickel chloride, nickel fluoride and nickel iodide, with an organic phosphine sulfide or an organic thiophosphate. In preparing the complex the order of addition of the two components is immaterial.

The organic phosphine sulfides suitable for preparing the catalyst complexes of this invention can be represented by the general formula:

I

and the suitable thiophosphates are the organic thiophosphates represented by the general formula:

II
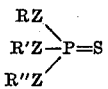

the organic thiophosphonates represented by the general formula:

III
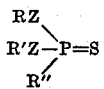

or the organic thiophosphinates represented by the general formula:

IV

wherein Z represents an oxygen atom, an amido (—NH— or —NR—) radical or a sulfur atom; R represents an unsubstituted or substituted alkyl radical containing up to about 22 carbon atoms, or more, such as methyl, ethyl, propyl, butyl, chloropropyl, methoxyethyl, chloroethyl, 2-ethylhexyl, benzyl, phenethyl, and the like, or an unsubstituted or substituted aryl radical such as phenyl, naphthyl, tolyl, xylyl, chlorophenyl, dichlorophenyl, nitrophenyl, nitrotolyl, and the like; R' and R" when taken singly can represent an unsubstituted or substituted alkyl or aryl radical as hereinbefore defined for R, and when taken together R'Z and R"Z can represent a cyclic dioxa nucleus or a substituted cyclic dioxa nucleus. By the term "cyclic dioxa nucleus" is meant a cyclic group as represented by the following formula:

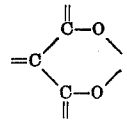

wherein the two oxygen atoms (Z) are connected to the phosphorus atom of the pentavalent phosphorus of the $>P=S$ radical, and wherein the carbon atoms of the dioxa nucleus have their valences satisfied by hydrogen atoms or other radicals. Hereinafter the terms "alkyl radicals" and "aryl radicals" will be used to represent both the unsubstituted and substituted radicals.

The organic phosphine sulfides and organic thiophosphates that can be used in this invention can be represented by the general formula:

wherein the X's represent the R, R', R", RZ, R'Z and R"Z radicals hereinbefore indicated.

Illustrative of the organic phosphine sulfides (Formula I) which are suitable for use in this invention, there may be mentioned triethylphosphine sulfide, tributylphosphine sulfide, tri-(methoxyethyl)-phosphine sulfide, triphenylphosphine sulfide, tritolylphosphine sulfide, tri-(chlorophenyl)-phosphine sulfide, and the like.

Among the organic thiophosphates of Formula II which can be used in this invention, there may be mentioned triethyl thiophosphate,
tri-(methoxyethyl) thiophosphate,
tri-(2-chloropropyl) thiophosphate,
triphenyl thiophosphate,
tribenzyl tetrathiophosphate,
triphenyl tetrathiophosphate,
triethyl tetrathiophosphate,
5,5 - diethyl - 2 - ethylmercapto - 2 - thiono - 1,3,2 - dioxaphosphorinane,
2 - butylmercapto - 5 - ethyl - 4 - propyl - 2 - thiono-1,3,2-dioxaphosphorinane,
O,O'-diethyl-S-ethyl dithiophosphate,
S-butyl O,O'-diphenyl dithiophosphate,
O,O'-diethyl S-phenyl dithiophosphate,
S,S'-diethyl O-ethyl trithiophosphate,
S,S'-dipropyl O-phenyl trithiophosphate,
O-butyl S,S'-diphenyl trithiophosphate,
N,N',N"-triethylthiophosphoramide,
N,N',N"-tribenzylthiophosphoramide,
N,N'N"-triphenylthiophosphoramide,
2,4 - dioxa - 5 - methyl - P - methylamido - P - thiono - 3-phosphobicyclo [4.4.0]decane,
O,O'-diethyl methylamidothiophosphate,
O,O'-diphenyl anilinothiophosphate,
O-ethyl dianilinothiophosphate,
O-tolyl di-(ethylamido)-thiophosphate,
S,S'-diethyl ethylamidotrithiophosphate,
S,S'-dibutyl anilinotrithiophosphate,
S-ethyl di-(methylamido)dithiophosphate,
S-phenyl dianilinodithiophosphate,
O-ethyl S-ethyl ethylamidodithiophosphate, and the like.

Suitable organic thiophosphonates representative of the compounds depicted by Formula III are O,O'-diethyl ethanethiophosphonate, O,O'-diethyl benzenethiophosphonate, S,S'-diphenyl propanetrithiophosphonate, S,S' - dibutyl toluenetrithiophosphonate, S,S' - diethyl ethanetrithiophosphonate, O-ethyl S-phenyl propanedithiophosphonate, di-(ethylamido) ethanethiophosphonate, butylamido O-phenyl ethanethiophosphonate, S-ethyl P-ethylamido benzenedithiophosphonate, and the like.

Illustrative organic thiophosphinates representative of the compounds depicted by Formula IV are ethylamido diethylthiophosphinate, ethylamido diphenylthiophosphinate, anilino dibutylthiophosphinate, O-ethyl dipropylthiophosphinate, O-cresyl dicresylthiophosphinate, S-ethyl diethyldithiophosphinate, S-ethyl diphenyldithiophosphinate, and the like.

The catalyst complex can be prepared by adding the organic phosphorus-sulfur compound to the alcohol reactant to be used in producing the acrylic acid ester, and then adding the nickel halide thereto, or the reverse order of addition can be used.

The starting alcohols are preferably the aliphatic monohydroxy saturated alcohols having up to about 22 carbon atoms and preferably from about 1 to about 12 carbon atoms in the molecule. Illustrative alcohols are ethanol, pentanol, 2-ethylhexanol, dodecanol, 3-ethyl-2-pentanol, ethylene glycol monomethyl ether, ethylene glycol monoethyl ether, and the like.

The acrylic acid esters are produced by the interaction of acetylene with carbon monoxide and an alcohol at elevated temperature and under increased pressure in the presence of a catalytic amount of the complex combination produced with a nickel halide and an organic thiophosphate.

The reaction is successfully carried out with our catalyst complex at temperatures of from about 90° C. to about 250° C. or higher. Temperatures of from about 100° C. to about 200° C. are preferred. The reaction can be expedited by the use of slight pressures; and we prefer to work at pressures exceeding about 100 p.s.i.g., with pressures of from about 400 p.s.i.g. to about 500 p.s.i.g. most preferred. Higher pressures can, of course, be used with proper precautions.

The mole ratio of nickel halide to organic phosphorus-sulfur compound can be varied over wide limits, and does not appear to be critical; nevertheless, we prefer to employ equimolar amounts of each component. The amount of catalyst complex charged to the reaction mixture is not critical, and can be varied over a wide range, so long as a catalytic amount is present. When based on the alcohol charged, it has been found that a catalyst complex containing about 0.0622 mole each of the nickel halide and of the organic phosphorus-sulfur compound per 16 moles of alcohol yields the highest conversions from an economical viewpoint. Higher concentrations of catalyst would give a faster reaction, but would require a greater expense in catalyst cost; while lower concentrations would be more economical as far as catalyst cost is concerned, but the productivity would suffer.

The reaction can be carried out in a batchwise or in a continuous manner by methods which are known to the art. The acetylene and carbon monoxide can be added separately, or for reasons of safety, as a mixture of gases, which mixture can be widely varied.

The following examples further serve to illustrate this invention. Parts are by weight unless otherwise specified.

Example 1

A three-liter stainless steel rocking autoclave was charged with 550 g. of ethanol, 10.2 g. of tribenzyltetrathiophosphate, $(C_6H_5CH_2S)_3P=S$, and 10.2 g. of nickel bromide, sealed and purged with carbon monoxide and then with a 1:1 mixture, by volume, of acetylene and carbon monoxide. The autoclave was rocked and the pressure was increased to 40 p.s.i.g. by the further addition of the acetylene-carbon monoxide mixture. The gas addition was halted and the autoclave was heated to 100° C. at which time the pressure was increased 25 p.s.i.g. by the addition of acetylene. The total pressure was then increased to 300 p.s.i.g. with the acetylene-carbon monoxide mixture, and heating continued to a temperature of 149° C. At this point the pressure was increased to 450 p.s.i.g. and maintained between 400 p.s.i.g. to 450 p.s.i.g. by the periodic addition of the acetylene-carbon monoxide mixture for 3.7 hours. During this period the temperature was maintained between 145° C. to 155° C. The reaction was stopped by cooling the autoclave with air and then releasing the pressure. The reaction mixture was filtered to remove solid materials, and the filtrate was distilled to separate the monomeric ethyl acrylate, most of which distilled as the ethyl acrylate-ethanol azeotrope, from the higher boiling acrylate esters and polymer-containing residue. The total yield of monomeric ethyl acrylate obtained was 351 g.

Example 2

In the manner described in Example 1, 740 g. of ethanol was treated with acetylene and carbon monoxide at 162° C. to 180° C. over a 2.6 hour period in the presence of a complex combination of 13.6 g. of nickel bromide and 14.4 g. of 2-butylmercapto-5-ethyl-4-propyl-2-thiono-1,3,2-dioxaphosphorinane

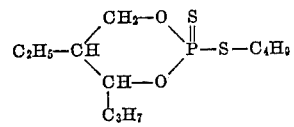

as catalyst. The yield of ethyl acrylate was about 45 g. as estimated from the amount of gas consumed.

In a similar manner one can produce the propyl or butyl esters of acrylic acid by substituting the appropriate alcohol for the ethanol.

Example 3

In the manner described in Example 1, 740 g. of ethanol was treated with acetylene and carbon monoxide at 155° C. to 170° C. over a 5.1 hour period in the presence of a complex combination of 13.6 g. of nickel bromide and 14.6 g. of 2,4-dioxa-5-methyl-P-methylamido-P-thiono-3-phosphobicyclo [4.4.0] decane

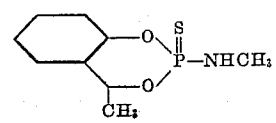

as catalyst. The yield of monomeric ethyl acrylate was 312 g.

Example 4

In the manner described in Example 1, 740 g. of ethanol was treated with acetylene and carbon monoxide at 164° C. to 173° C. over a three-hour period in the presence of a complex combination of 13.6 g. of nickel bromide and 21.4 g. of tri(2-chloropropyl) thiophosphate, $(CH_3CHClCH_2O)_3P=S$, as catalyst. The yield of monomeric ethyl acrylate was about 210 g. as estimated from the amount of gas consumed.

What is claimed is:

1. In the manufacture of an acrylic acid ester by the interaction of acetylene with carbon monoxide and an alcohol at elevated temperature and under increased pressure, the improvement which comprises carrying out the reaction in the presence of a catalyst complex combination of a nickel halide and an organic phosphorus-sulfur compound containing a pentavalent phosphorus atom having a thiono radical attached thereto as represented by the general formula:

wherein X represents a member selected from the group consisting of R, R', R'', RZ, R'Z and R''Z in which R, R' and R'' represent members selected from the group consisting of alkyl radicals containing up to about 22 carbon atoms and aryl radicals selected from the group consisting of a phenyl and naphthyl radical, Z represents a member selected from the group consisting of an oxygen atom, a sulfur atom and an amido radical; and when taken together R'Z and R''Z represents a cyclic dioxa nucleus.

2. In the manufacture of an acrylic acid ester by the interaction of acetylene with carbon monoxide and an alcohol at elevated temperature and under increased pressure, the improvement which comprises carrying out the reaction in the presence of a catalyst complex combination of a nickel halide and an organic thiophosphate selected from the group represented by the general formula:

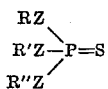

wherein R, R' and R'' represent members selected from the group consisting of alkyl radicals containing up to about 22 carbon atoms and aryl radicals selected from the group consisting of a phenyl and naphthyl radical; Z represents a member selected from the group consisting of an oxygen atom, a sulfur atom and an amido radical; and when taken together R'Z and R''Z represents a cyclic dioxa nucleus.

3. In the manufacture of an acrylic acid ester by heating at a temperature between about 90° C. and about 250° C. and under a pressure exceeding 100 p.s.i.g. an aliphatic monohydroxy saturated alcohol having from 1 to about 12 carbon atoms with carbon monoxide and acetylene, the improvement which comprises carrying out the reaction in the presence of a catalyst complex combination of a nickel halide and an organic thiophosphate selected from the group represented by the general formula:

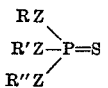

wherein R, R' and R'' represent members selected from the group consisting of alkyl radicals containing up to about 22 carbon atoms and aryl radicals selected from the group consisting of a phenyl and naphthyl radical; Z represents a member selected from the group consisting of an oxygen atom, a sulfur atom and an amido radical; and when taken together R'Z and R''Z represent a cyclic dioxa nucleus.

4. In the manufacture of an acrylic acid ester by the inter-action of acetylene with carbon monoxide and an alcohol at elevated temperature and under increased pressure, the improvement which comprises carrying out the reaction in the presence of a catalyst complex combination of a nickel halide and $$(CH_3CHClCH_2O)_3P=S$$

5. In the manufacture of an acrylic acid ester by the inter-action of acetylene with carbon monoxide and an alcohol at elevated temperature and under increased pressure, the improvement which comprises carrying out the reaction in the presence of a catalyst complex combination of a nickel halide and $$(C_6H_5CH_2S)_3P=S$$

6. In the manufacture of an acrylic acid ester by the inter-action of acetylene with carbon monoxide and an alcohol at elevated temperature and under increased pressure, the improvement which comprises carrying out the reaction in the presence of a catalyst complex combination of a nickel halide and

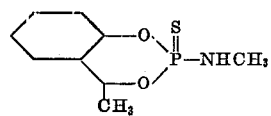

7. In the manufacture of an acrylic acid ester by the inter-action of acetylene with carbon monoxide and an alcohol at elevated temperature and under increased pressure, the improvement which comprises carrying out the reaction in the presence of a catalyst complex combination of a nickel halide and

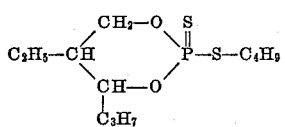

References Cited in the file of this patent

UNITED STATES PATENTS 2,806,040    Reppe et al.            Sept. 10, 1957

FOREIGN PATENTS 805,641      Germany              May 25, 1951